H. G. HOWARD.
TRACTOR WHEEL.
APPLICATION FILED SEPT. 14, 1920.
1,424,098.
Patented July 25, 1922.
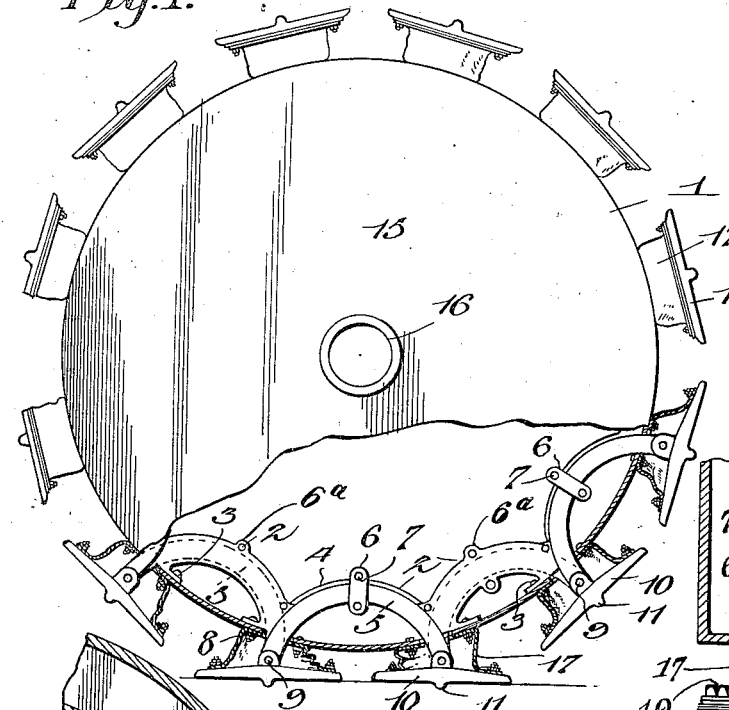
Fig. 1.
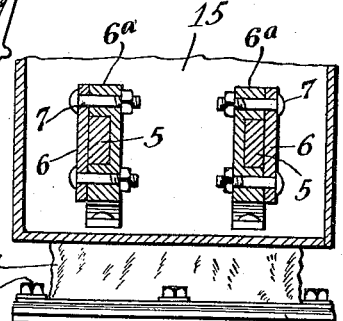
Fig. 4.
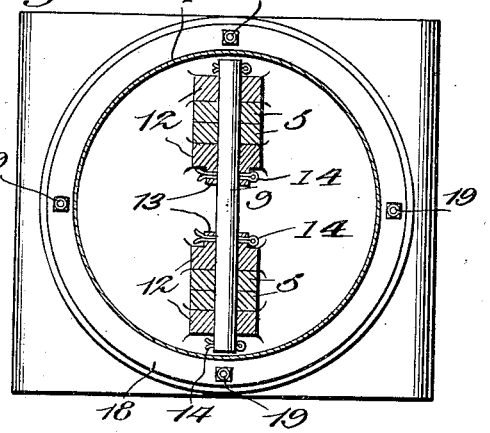
Fig. 3.
Fig. 2.
Harry G. Howard, INVENTOR
BY Victor J. Evans ATTORNEY
WITNESS: J. W. Ely

UNITED STATES PATENT OFFICE.

HARRY G. HOWARD, OF GREENWICH, NEW YORK.

TRACTOR WHEEL.

1,424,098. Specification of Letters Patent. Patented July 25, 1922.

Application filed September 14, 1920. Serial No. 410,139.

*To all whom it may concern:*

Be it known that I, HARRY G. HOWARD, a citizen of the United States, residing at Greenwich, in the county of Washington and State of New York, have invented new and useful Improvements in Tractor Wheels, of which the following is a specification.

This invention relates to improvements in tractor wheels and one of the principal objects of the invention is to provide a device of this nature with improved tread mechanism which may be easily adapted to any width of tire.

Another object is to provide a device of this nature in which two of the tread faces are always on the ground.

Another object is to provide means for enclosing the working parts in such a device and protecting the same from the dirt and weather.

Another object is to provide a device which shall eliminate the elaborate and expensive oiling systems now necessary.

Another object is to provide a device which will automatically adjust itself to unevennesses in the ground over which it is traveling.

Another object is to provide an efficient device of this nature which shall be of comparatively light weight.

Another object is to provide a device of this nature with treads so mounted as to be able to accommodate themselves to the inclined faces of rough ground.

Another object is to provide a device which shall be simple of construction, cheap to manufacture and effective for the purpose for which it is designed.

Other objects will appear from the following description and claims; and all of these objects are attained by the mechanism shown in the accompanying drawing comprising one sheet, in which:—

Figure 1 is a side elevational view of my improved tractor wheel with parts broken away for the sake of clearness.

Figure 2 is a fragmentary vertical sectional view of one of the treads and the immediate connections.

Figure 3 is a horizontal sectional view taken along the line of one of the tread pivot bolts.

Figure 4 is a fragmentary transverse vertical sectional view of the wheel showing the arrangement of the guide castings.

Like characters of reference refer to like parts in all views.

This invention contemplates the provision of a tractor wheel which shall comprise a plurality of tread members each pivotally mounted at the ends of oppositely directed arcuate slides, said slides mounted in housings inside the rim of the wheel and protected in the first instance by side plates on the wheels and in the second place by leather or other flexible sleeves surrounding the exposed portions of the slides.

Referring more particularly to the drawings, 1 represents the rim of my improved tractor wheel, and 2 represents a plurality of arcuate guide castings which are secured to the rim 1 by bolts 3 or in any other desired manner. Each of the members 2 is provided with a slot 4, these slots facing alternately toward opposite sides of the wheel. Each slot 4 is formed in a vertical face of one of the members 2. There are two sets of these castings, one set at each side of the wheel. However, if desired, all of the castings of each set may be cast in a single piece.

Mounted in each of the slots 4 is a respective arcuate slide 5, the adjacent ends of two adjacent members 5 of either set, being side by side and adapted to be secured together. The slides 5 are held in the slots 4 by means of links 6 which pass across the slots and are secured to ears $6^a$ on the members 2 by bolts 7. Adjacent ends of the slides pass through slots 8 in the rim 1. It will thus be seen that the adjacent ends of four slides project through the rim in such relationship with each other that they may be secured together by a single bolt 9.

But the bolt 9, not only passes through the four ends of the slides, but also acts as a pivot for securing a tread member 10 in place. This tread member 10 is provided on its outer face with a lug or ridge 11 for assisting in obtaining a firm gripping action of the tread. On its under side, each tread is provided with four bosses 12 which are arranged in pairs and each pair is adapted to receive the adjacent ends of two slides 5 between the bosses of the pair. The bolt 9 passes through all four of the bosses 12 and through four slides 5, as seen in Figure 3. The two inner bosses 12 are provided with inwardly extending lugs 13 through which the bolt 9 passes and through these bosses and the bolt 9 are thrust cotter pins 14 to prevent the displacing of the bolt.

I have described one tread and its connected slides, but it is to be understood that there are a plurality of these treads all of which are constructed and mounted in the same manner.

The slides inside the rim are protected from dust and dirt by shields or disks 15 which enclose the entire area inside the rim and which may be provided with apertures 16 for the passage of the wheel axle.

In order to protect the working parts of the slides where they protrude beyond the rim 1, sleeves 17 of leather or any flexible material are provided, one sleeve for each of the tread members 10. Each sleeve is secured to the tread member at its outer end by being clamped between the tread and a member 18 which is of washer formation and adapted to fit against the entire edge of the sleeve 17. Bolts 19 secure the member 18 in place on the tread member 10. The lower margin of the sleeve 17 is secured to the rim 1 adjacent to the openings 8 by a member 20 similar to the member 19 and clamped in place by bolts 21 passing through the rim 1.

It will be understood that in operation the wheel when rotating will always keep at least two of the tread members 10 in contact with the ground and that any unevenness in the ground will be readily compensated for by the movement of the slides 5 in their sheaves 2.

While I have described what I deem to be the most desirable embodiment of my invention, it is obvious that many of the details may be varied without in any way departing from the spirit of my invention; and I therefore do not limit myself to the exact details of construction herein set forth nor to anything less than the whole of my invention limited only by the appended claims.

What I claim as new and desire to secure by Letters Patent is:—

1. In a device of the class described, the combination of a rim, a plurality of series of arcuate members slidably mounted in said rim, a plurality of tread members each pivotally secured to a plurality of said arcuate members, and arcuate housings for said arcuate members.

2. In a device of the class described, the combination of a rim, a housing secured to said rim, an arcuate member mounted in said housing and adapted to project through said rim, a tread member pivotally secured to said arcuate member, and a flexible sleeve secured to said rim and to said tread member for protecting the projecting portion of said arcuate member.

3. In a device of the class described, the combination of a rim, a plurality of arcuate housings mounted on said rim, an arcuate member slidably mounted in each of said housings and projected from said rim, a tread member pivotally secured to each of said arcuate members, a flexible sleeve secured at opposite ends to said rim and said tread member for protecting the projecting portion of said arcuate members, and means for securing said sleeves in place.

4. In a device of the class described, the combination of a rim, a plurality of arcuate housings mounted on said rim, a plurality of slides mounted in said housings, a plurality of tread members each secured to a plurality of said slide members, and means for securing said slide members in said housings.

In testimony whereof I have affixed my signature.

HARRY G. HOWARD.